(12) United States Patent
Nicosia

(10) Patent No.: US 8,990,101 B2
(45) Date of Patent: *Mar. 24, 2015

(54) CUSTOMIZABLE SITUATIONAL AWARENESS DASHBOARD AND ALERTS, AND ASSOCIATED SYSTEMS AND METHODS

(75) Inventor: Christopher P. Nicosia, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 902 days.

This patent is subject to a terminal disclaimer.

(21) Appl. No.: 11/935,369

(22) Filed: Nov. 5, 2007

(65) Prior Publication Data
US 2010/0042445 A1 Feb. 18, 2010

Related U.S. Application Data

(60) Provisional application No. 60/857,469, filed on Nov. 6, 2006.

(51) Int. Cl.
*G06F 19/00* (2011.01)
*G08G 5/00* (2006.01)
*G06F 17/30* (2006.01)
*G06Q 10/06* (2012.01)
*G06Q 10/10* (2012.01)
*G06Q 50/30* (2012.01)

(52) U.S. Cl.
CPC ........ *G08G 5/0013* (2013.01); *G06F 17/30017* (2013.01); *G06Q 10/063114* (2013.01); *G06Q 10/10* (2013.01); *G06Q 50/30* (2013.01)
USPC .......................................................... 705/11

(58) Field of Classification Search
USPC .................................................... 701/3, 120
See application file for complete search history.

(56) References Cited

U.S. PATENT DOCUMENTS

| | | | |
|---|---|---|---|
| 6,160,497 A * | 12/2000 | Clark | 340/961 |
| 7,813,871 B2 * | 10/2010 | Small et al. | 701/120 |
| 2004/0070605 A1 | 4/2004 | Huang et al. | |
| 2004/0260598 A1 | 12/2004 | Kumhyr et al. | |
| 2005/0190079 A1 | 9/2005 | He | |
| 2005/0192738 A1 | 9/2005 | Conner et al. | |
| 2006/0047378 A1 | 3/2006 | Betters et al. | |
| 2006/0184583 A1 * | 8/2006 | Renton et al. | 707/104.1 |

OTHER PUBLICATIONS

International Search Report and Written Opinion; International Patent Application No. PCT/US07/23439; Filed: Nov. 6, 2007; Applicant: The Boeing Company; Mailed on Nov. 21, 2008.
European Search Report for European Patent Application No. 07870856.7, Applicant: The Boeing Company, mailed Feb. 13, 2012, 6 pages.

* cited by examiner

*Primary Examiner* — Tsan-Yu J Huang
(74) *Attorney, Agent, or Firm* — Mark E. Stallion, Esq.; Husch Blackwell LLP

(57) ABSTRACT

A customizable situational awareness system is described that allows a user to customize the type of information that the user receives through a user interface, e.g., a dashboard, displayed by the system. In particular embodiments, the system can allow the user to configure alerts that are sent to the user's mobile or other device based on situational awareness events. In further embodiments, the customizable situational awareness system receives user configuration data related to flight events, maintenance events, and alerts. When the system receives situational awareness data, the system can retrieve the user's configuration data and display the situational awareness data based on the user's configuration data. Thus, aspects of the customizable situational awareness system allow the user to access information that is more relevant to the user and to filter out less relevant information.

19 Claims, 10 Drawing Sheets

Set Preferences

Set Screen Preferences

| Zoom | Time Settings | Events | Tail Numbers | Alerts |

⎫ 505

⎫ 550

Customize alerts to view on the dashboard, or alerts sent to a mobile device. Click columns to sort.

| Dashboard Alerts | Mobile Alerts |  554

☑ Select All Alerts  555

| Alert Name | Category | Priority |
|---|---|---|
| ☑ A Maintenance Event cancelled which will occur within the next 24 hours. | Maintenance | Medium |
| ☑ Air Turnback (ATB) | Flight | High |
| ☑ Estimated start of Maintenance Event will be started Late | Maintenance | Low |
| ☑ Flight Diversion (DIV) | Flight | High |
| ☑ Flight Leg Cancelled | Flight | Medium |
| ☑ Flight Leg not started on-Time | Flight | Medium |
| ☑ Maintenance Event in progress updated: Est. Completion time earlier than planned. | Maintenance | High |
| ☑ Maintenance Event in progress updated: Planned End Time Changed | Maintenance | High |
| ☑ Maintenance Event invalidated by previous Flight Leg | Maintenance | Medium |
| ☑ Maintenance Event invalidated by previous Flight Leg | Maintenance | High |
| ☑ Maintenance Event not Ended On-Time | Maintenance | High |
| ☑ Maintenance Event not Started On-Time | Maintenance | Low |
| ☑ MIREP | Maintenance | Medium |
| ☑ Mx Opportunity (don't alert) | Maintenance | High |

⎫ 556      ⎫ 558

Options

Show my Dashboard Alerts when they occur for the following:

Regions: ☐ All      Regions: ☐ All      Show Alerts for the past:

☑ Africa         ☑ British Airways
☑ Asia           ☑ Delta Airlines
☑ Australia      ☑ Japan Airlines
☑ North America  ☑ Mexicana Airlines
☑ South America  ☑ Qantas Airlines
☑ Europe         ☑ South Africa Airlines ( Set as Default ) ( Return to Default )          ( Apply ) ( OK ) ( Cancel ) ( Help )

CUSTOMIZABLE SITUATIONAL AWARENESS DASHBOARD AND ALERTS, AND ASSOCIATED SYSTEMS AND METHODS

CROSS-REFERENCE TO RELATED APPLICATION

The present application claims the benefit of U.S. Provisional Application No. 60/857,469, entitled "Systems and Methods for Gate Situational Awareness, Flight Following, and Alerting," filed Nov. 6, 2006, (Boeing Ref. No. 06-1045), which is incorporated by reference herein in its entirety.

TECHNICAL FIELD

The present disclosure relates generally to customizable situational awareness dashboards and alerts, and associated systems and methods.

BACKGROUND

In 2005, airlines moved nearly five million people over 40 million miles every day. Conventional airlines, however, do not make optimal use of their aircraft and personnel. For example, airlines generally do not capitalize on existing information residing in various systems because each system solves a niche problem. By understanding the interrelated factors (e.g., weather, unscheduled equipment maintenance, late airplane arrivals, late passengers, crew shortages, aircraft loading, regulatory authority practices, etc.) that can delay an aircraft turn at a gate of an airport, situational awareness of actual events in relation to the flight schedule can provide information to maximize profits. Situational awareness communications are not limited to gathering and presenting data from a plurality of aircraft systems when the aircraft is in the air, but also includes gathering data when the aircraft is on the ground. Situational awareness communication is generally bidirectional.

Situational awareness is a term that may be used to refer to the degree of accuracy by which one's perception of his/her current environment mirrors reality. It is the ability to identify, process, and comprehend the critical elements of information about what is happening in a person's respective environment based on a mission, for example, airline operations. More simply, situational awareness refers generally to one's knowledge what is going on around one. Different groups of people and different people within a group need different information to be aware of different aspects of a situation in order to determine a proper resolution to the situation. When an enterprise loses situational awareness, there is increased potential for human error and other mishaps.

Situational awareness in the context of airline operations has traditionally been confined to ground based systems with ground-based presentation to ground based users. Increasingly sophisticated on-board automated aircraft systems and aircraft communication systems provide the opportunity for the aircraft, whether in the air or on the ground to be in communication in real time with systems on the ground. For example, airline, airport station, maintenance operations, and business functions have traditionally been complex, and characterized by failures in situational awareness. In the future, these airline operations will be even more complex because more information will be available from the aircraft to make decisions. Accordingly, there is a need for enhanced situational awareness systems for airline operations.

SUMMARY

A drawback associated with at least some of the foregoing systems is that the user is often faced with too much information to take timely and effective action.

One embodiment described herein is an aircraft situational awareness system. The system includes a plurality of airline enterprise systems. The system also includes an integration system coupled to the plurality of enterprise systems and configured to receive data relating to aircraft situational awareness from the enterprise systems. The system also includes a decision support system coupled to the integration system and configured to correlate situational information received from one or more of the enterprise systems with one or more business rules received from the integration system. The decision support system is further configured to generate an aircraft situational awareness data set from the correlated data and process the aircraft situational awareness data set in view of one or more user profiles. The system also includes a user interface coupled to the integration system and the decision support system, the user interface being configured to display a view of the aircraft situational awareness data set based, at least in part, on the one or more user-modifiable user profiles.

Another embodiment described herein is a method for providing an enterprise with situational awareness data for conditions related to aircraft departure. The method receives data from a plurality of airline enterprise systems related to one or more events that can affect conditions related to an aircraft's departure. The method correlates the received data in accordance with one or more business rules. The method generates an aircraft departure situational awareness data set from the correlated data and processing the aircraft departure situational awareness data set in view of one or more user profiles. Then, the method displays a view of the aircraft situational awareness data set to a user based, at least in part, on the user profile associated with the user.

Another embodiment described herein is a computer-readable storage medium encoded with instructions for controlling a computer system to receive customizations to a displayable view of aircraft situational awareness data, by a method. The method receives a request from a user to view customization options for customizing the displayable view of the aircraft situational awareness data. The method displays a customization user interface having options for configuring the display of at least flight events, maintenance events, and alert messages. The method receives one or more preference selections from the user based on the displayed options. The method stores the preference selections received from the user in a nonvolatile storage device. Then, the method displays a situational awareness dashboard based on the stored preference selections of the user.

BRIEF DESCRIPTION OF THE DRAWINGS

FIGS. 5A-5E are display diagrams that illustrate tabs of a user interface for receiving customizations from a user in one embodiment of the disclosure.

DETAILED DESCRIPTION

Overview

A customizable situational awareness system is described that allows a user to customize the type of information that the user receives through a user interface, called a dashboard, displayed by the system. In particular embodiments, the system allows the user to configure alerts that are sent to the user's mobile device based on situational awareness events. The customizable situational awareness system can receive user configuration data related to flight events, maintenance events, and alerts. For example, the user may indicate the specific aircraft for which the user is interested in viewing situational awareness information. When the system receives situational awareness data, the system can retrieve the user's configuration data and display the situational awareness data based on the user's configuration data. Thus, embodiments of the customizable situational awareness system can allow the user to easily access the information considered by the user to be more important information, and to filter out less relevant information. In this way, the user can take timely and effective action based on the received information.

Figure 1:
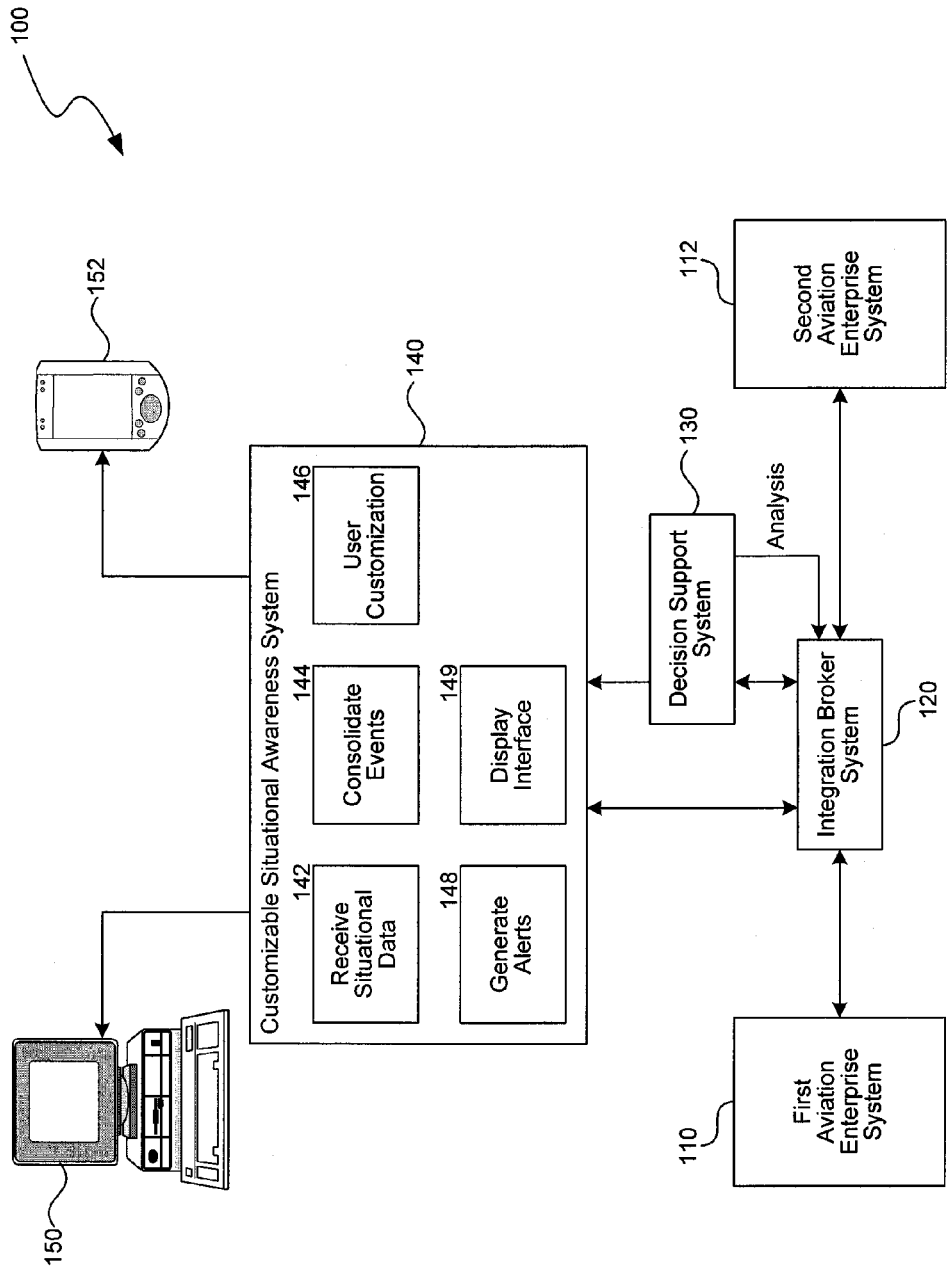
FIG. 1 is a block diagram that illustrates components of a customizable situational awareness system and related systems in one embodiment of the disclosure.

FIG. 1 is a block diagram that illustrates components of a representative customizable situational awareness system 100 and related systems in one embodiment. The system 100 can include a first aviation enterprise system 110, a second aviation enterprise system 112, and an integration broker system 120 operatively coupled to the aviation enterprise systems 110 and 112. The first and second aviation enterprise systems 110 and 112 are systems that monitor aspects of airline operation, such as air traffic, maintenance plans, or various other aspects as described above. Although only two aviation enterprise systems are illustrated in FIG. 1, it should be understood that the system 100 can include more than two aviation enterprise systems coupled to the integration broker system 120.

The system 100 can also include a decision support system 130 operably coupled to the integration broker system 120. The decision support system 130 retrieves information related to situations of which various users are to be advised. For example, the decision support system 130 can include a set of data parameters that define data of which individuals need to be aware and such data are continuously pulled from the respective aviation enterprise systems 110 and 112 via the integration broker system 120. The integration broker system 120 accordingly provides a conduit through which situational awareness requests/retrievals are passed to the decision support system 130. The retrieved data can be correlated with one or more business rules (e.g., rules defined by an entity controlling how data are interpreted). For example, the failure rate of an aircraft component and the speed with which it is repaired may differ between two airline companies based on the priority each airline places on replacement of the failed component. The priority and interpretation of an event or situation may vary from airline to airline based on business rules and the manner in which data are interpreted by the business rules. The data can be further processed in view of historical data retrieved by the decision support system 130 and/or other selected parameters.

The decision support system 130 is configured to transmit the situational awareness data to a customizable situational awareness system 140 that further processes the situational awareness data in view of the user profiles of the individual users networked to the system. The customizable situational awareness system includes a receive situational data component 142, a consolidate events component 144, a user customization component 146, a generate alerts component 148, and a display interface component 149. The receive situational data component 142 receives situational data such as updates regarding the status of an aircraft, maintenance schedules, conditions in the air and on the ground, and so on. The consolidate events component 144 consolidates the received situational data into a form useful for taking action or understanding the situational data. For example, the consolidate events component may identify a specific maintenance procedure that should be performed based on several received out-of-specification sensor values. The user customization component 146 receives user customizations indicating how the user wants to receive the consolidated event data. The generate alerts component 148 generates alerts to a user (e.g., through the user's mobile device) based on the user's preferences. The display interface component 149 displays the dashboard user interface based on the user's preferences. In some embodiments, the display or dashboard is part of a web portal application accessible through a web browser through which the user can perform many functions related to aircraft. One example is the MyBoeingFleet web portal, which provides aircraft data to registered users.

The profile of a respective user determines the data presented to the user concerning situational awareness. In this way, the customizable situational awareness system 140 presents the situational awareness data in manner that is optimized or at least tailored in accordance with each user's preferences for viewing such data. Users of the system 100 may view the situational awareness data presented to the customizable situational awareness system 140 via a user workstation 150 (e.g., a personal computer or terminal) and/or a mobile device 152 (e.g., a PDA, handheld computer, or the like).

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments Receiving Situational Awareness Data Information related to situational awareness can be received from a variety of devices and systems. These devices and systems can be installed in aircraft, airport equipment, and/or other locations. One example of a device for providing situational awareness data is a Terminal Wireless LAN Unit (TWLU) installed into an airplane. The Terminal Wireless LAN Unit collects information on the aircraft and transmits the information to personnel on the ground using airport network infrastructure. Personnel can connect to the plane via the airport network or even over the Internet.

Another example of a device for providing situational awareness data is a Crew Wireless LAN Unit (CWLU) that allows personnel to connect to the plane directly. The Crew Wireless LAN Unit allows wireless access to the plane even when no airport infrastructure exists. The Automated Communication Addressing and Reporting System (ACARS), a digital datalink system for transmission of small messages between aircraft and ground stations via radio or satellite, can also be used to send and receive aircraft data. Numerous sensors and equipment on the plane may collect the data that is later made available. For example, Radio Frequency Identification (RFID) Tags track hardware and software configuration of the airplane and an Electronic Logbook digitally captures log reports and integrates with ground systems.

In a typical embodiment, the airplane collects situational data that is transmitted to the airplane manufacturer. The airplane manufacturer consolidates the information to produce useful knowledge about the airplane. Then, the airplane manufacturer shares this information with those responsible for the operation of the airplane, such as customers, lessors, MROs (Maintenance, Repair, Overhaul organizations or repair facilities), suppliers, and regulatory agencies.

Figure 2:
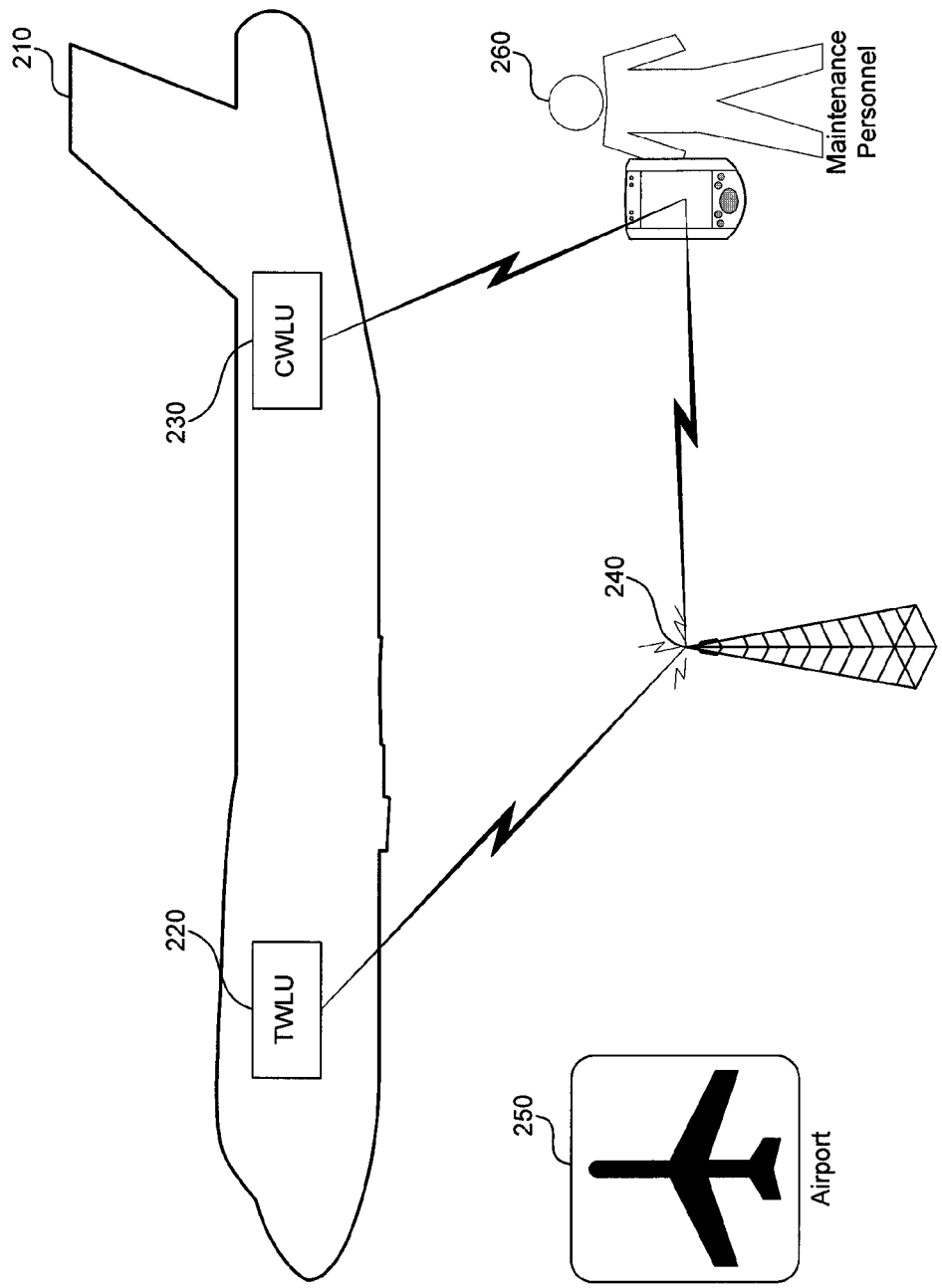
FIG. 2 is a block diagram that illustrates the process of collecting situational awareness data in one embodiment of the disclosure.

FIG. 2 is a block diagram that illustrates the process of collecting situational awareness data in one embodiment. An airplane 210 contains one or more situational awareness data collection devices, such as a TWLU 220 and a CWLU 230. The situational awareness devices transmit situational awareness data over a network such as the Internet 240, while the plane is in flight or on the ground, to an airport 250 or directly to maintenance personnel 260. The maintenance personnel 260 can then prepare for any needed repairs before the plane arrives at the airport 250 to turn the airplane 210 around for the next flight more quickly.

Display and Alert Customization

Figure 3:
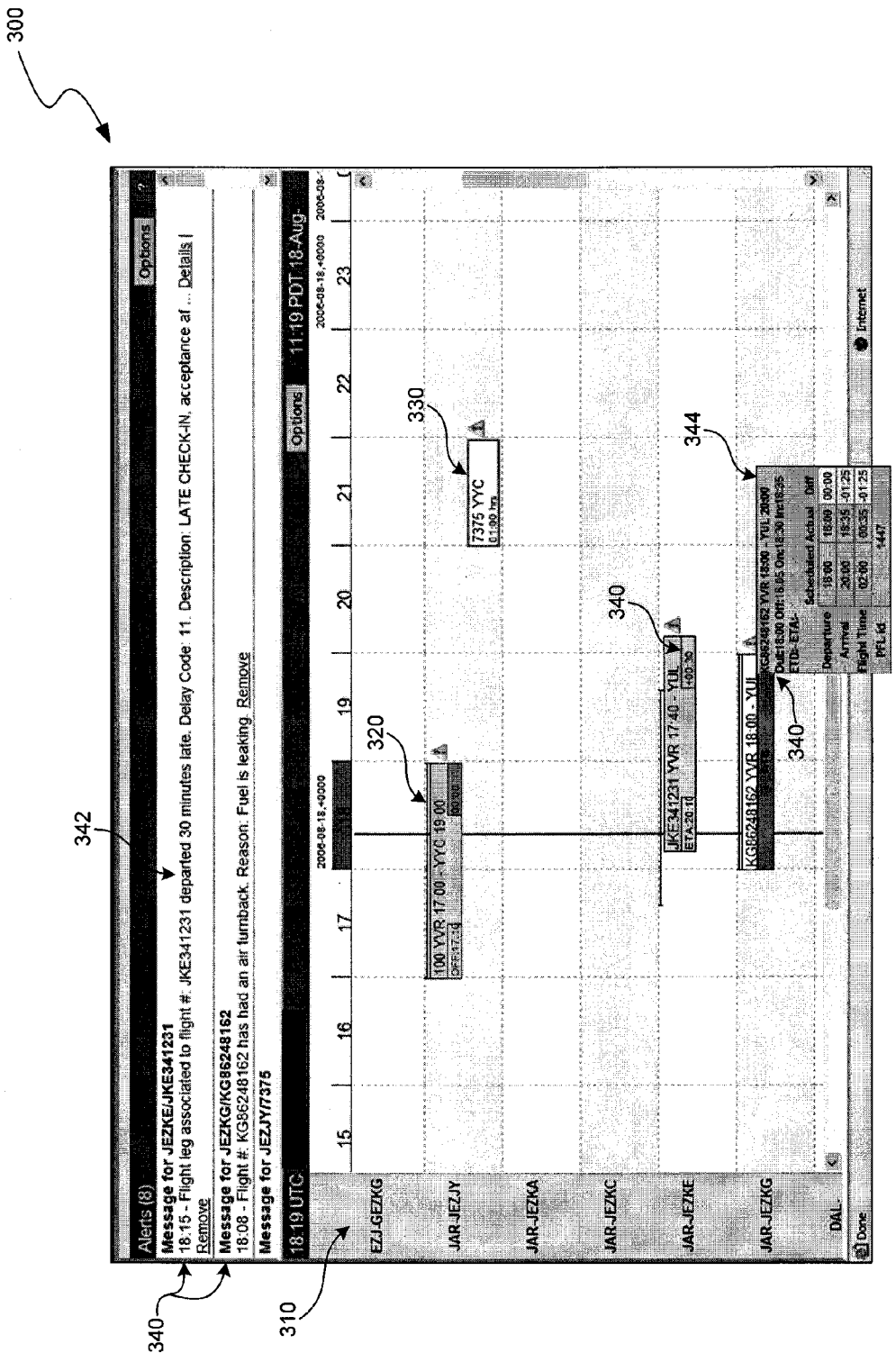
FIG. 3 is a display diagram of a situational awareness dashboard of the customizable situational awareness system configured in accordance with one embodiment of the disclosure.

FIG. 3 is a display diagram of a situational awareness dashboard 300 (e.g., the display interface component 149 of FIG. 1) of the customizable situational awareness system 140 configured in accordance with one embodiment of the disclosure. It should be understood that the dashboard 300 illustrated in FIG. 3 is merely a representative view provided for illustrative purposes and in other embodiments the dashboard 300 can include different features and/or the illustrated features can have a different arrangement.

The dashboard 300 is a customized display panel that brings a set of preselected airline operational data together onto a single screen. A user is able to view resources, assets, and weather information, and manipulate this information to quickly and efficiently solve, for example, a scheduled maintenance problem with minimal or no disruption to the overall operation of the airline. Examples of the information that may be overlaid on the dashboard 300, or a printout thereof, include (but are not limited to) flight following information (e.g., information informing the user of aircraft location), maintenance information (scheduled and unscheduled), areas in which weather can currently affect airline operation, airport operations which are currently a cause of concern, the status of the airline supply chain, and passenger (and/or cargo) loads. Such information is useful when attempting to plan resource allocations. In addition, such a system view affords a user the ability to drill down so that both internal and external information, such as alerts, can be quickly assessed, thus allowing the user to focus on solving any problems at hand. Furthermore, the information presented by the dashboard 300 can be customized in a number of different ways to provide users only with frequently used data and prevent users from being overloaded with unnecessary information.

The dashboard 300, for example, can include an aircraft identification portion 310 that displays a number of different aircraft tail numbers. The dashboard 300 can be configured to display tail numbers, for example, based on specific geographical regions, particular airlines, or other selected criteria. The user can also drill down (e.g., using a "mouseover" function and/or by right clicking one of the tail numbers in the aircraft identification portion) and get additional information about a particular aircraft, such as aircraft ownership, aircraft maintenance history, aircraft performance data, etc. The size of the information displayed on the dashboard 300 can also be adjusted to display a different number of tail numbers on the screen at one time.

The dashboard 300 also includes selected information about each particular aircraft (as identified by tail number 310). The information can assist a user in normal monitoring and planning conditions, and aid the user in making informed disruption and recovery decisions when such situations occur. In the illustrated embodiment, for example, the dashboard 300 includes flight following information 320, maintenance information 330, and alert notifications 340 for particular aircraft. The flight following information 320 can include flight information such as dispatch release, passenger load, weather, and other selected flight information. The flight following information 320 is generally correlated with flight schedules, airport schedules, maintenance schedules, and/or repair station schedules for each of the destinations for a particular aircraft.

The maintenance information 330 for a particular aircraft can include the type of maintenance event (e.g., planned, scheduled, and/or unplanned), the type of maintenance work to be performed, the availability of parts and/or tools for the particular maintenance event, and the personnel required for the event. The maintenance information 330 can also include links to external OEM documentation for the aircraft (e.g., maintenance manuals, maintenance planning documents, fault isolation/repair manuals, etc.) In one particular example, maintenance planners are able to determine a likelihood for a specific aircraft to be serviced at one of its destinations by combining the maintenance information 330 with fault messages received from a particular aircraft. By combining this scheduled information with real time data, the user can determine appropriate buffers between scheduled events and the feasibility of meeting necessary aircraft maintenance schedules.

The alert notifications 340 provide the user with updated information and messages regarding selected aircraft, maintenance facilities, and airport operations. The alert notifications 340 can include, for example, messages about maintenance events, flight diversions/cancellations, maintenance reports (MIREP), part(s)/tool(s) availability (IMM), etc. The user can receive alert messages via the dashboard 300 and/or a mobile device (not shown). On the dashboard 300 illustrated in FIG. 3, for example, the user can receive alert notifications 340 in a message portion 342 of the dashboard 300, as well as proximate to or within the flight following information 320 for a particular aircraft. The alert notifications 340 within the flight following information 320 can be expanded by right clicking the particular alert or by using the dashboard's "mouseover" functionality to expand the corresponding alert notification (as shown in expanded area 344).

The user can configure the dashboard 300 to filter out unnecessary or unwanted alert messages that would otherwise clutter the dashboard 300 or the user's mobile device. For example, in one embodiment the user can filter alert messages based on (a) message type, (b) alert category, and/or (c) alert priority. In other embodiments, the alert messages can be filtered using other criteria (e.g., geographic region, airline, etc.)

In several embodiments, the dashboard 300 can also be configured to provide past flight and maintenance events and information to the user. Such historical information can be used, for example, to determine the cause(s) of a delay or pinpoint supply chain problems. The historical information can be accessible using an integrated search functionality (e.g., by tail number, date(s), geographical region, airline, event type, etc.). In other embodiments, the search function can have a different configuration.

The dashboard 300 can also serve as a gateway to external applications, document(s), Web sites, or systems (e.g., MEM, FIM, etc.) to which the user would like to navigate for additional information or to perform an activity. Accordingly, rather than duplicate such information, the dashboard 300 enables users to directly link to the original source. Furthermore, the user can quickly access such information directly from the dashboard 300 without having to exit the application or launch a number of other external applications.

Another aspect of the dashboard 300 is the ability to integrate information from a plurality of independent aviation enterprise systems and present the information to a system user in a manner dependent on who the user is and preferences previously defined for the user. In one particular example, aircraft maintenance includes a plurality of enterprise systems and flight operations includes a plurality of enterprise systems each having its own information and related systems. While these sets of systems have related information, in the past the information was not joined together and presented to the user in a manageable arrangement for utilization. Users were required to review information from two or more systems separately and correlate the information on their own. The dashboard 300, however, provides the maintenance operations schedule integrated with a flight operations schedule, thus providing an overall awareness of availability of aircraft for scheduled maintenance and availability of maintenance facilities and materiel for unscheduled aircraft maintenance needs. Continuing with this example, the dashboard 300 can integrate the scheduling portion of maintenance operations and flight operations (schedules) associated with specific airports at which a respective plane having a maintenance problem may be landing, and present the results in real time. As mentioned previously, other aviation enterprise systems that may be integrated with maintenance and flight scheduling systems can include, but are not limited to, maintenance crew scheduling system, weather systems, air traffic control systems, systems maintaining data related to aircraft structural repairs, and systems containing documents regarding an aircraft's air worthiness.

One advantage of embodiments of the situational awareness system 100 and the dashboard 300 described above with reference to FIGS. 1 and 3 is that the system can present a wide variety of operational data in an integrated way. The system 100 also can present different views of the data associated with a situation, for example, related to aircraft departure, depending upon a respective user's profile. The dashboard 300 can synthesize the data by filtering the information and presenting the information that is the most important (or relevant) to an individual user. The information is presented in such a way that the data advises the respective user of a situation, thereby allowing the user to efficiently assess the situation and its potential impacts.

Another advantage of embodiments of the system 100 and dashboard 300 describe above is that they can provide for informed real-time decision making by all participants, thus expediting analysis and increasing a decision-making window for the system's participants. Additionally, resource and asset allocation can be optimized or otherwise improved for some or all aircraft departures, thereby resulting in predictive system-wide disruption management and improvements in schedule reliability. Further, embodiments of the system 100 are expected to improve management of an airline's resources by capturing measurable data for later analysis and improvement, as well as optimizing or at least improving gate and aircraft utilization. The system can empower individuals and encourage proactive decision-making. The system may also be configured to empower customers by providing current and accurate aircraft and gate situational awareness.

Figure 4:
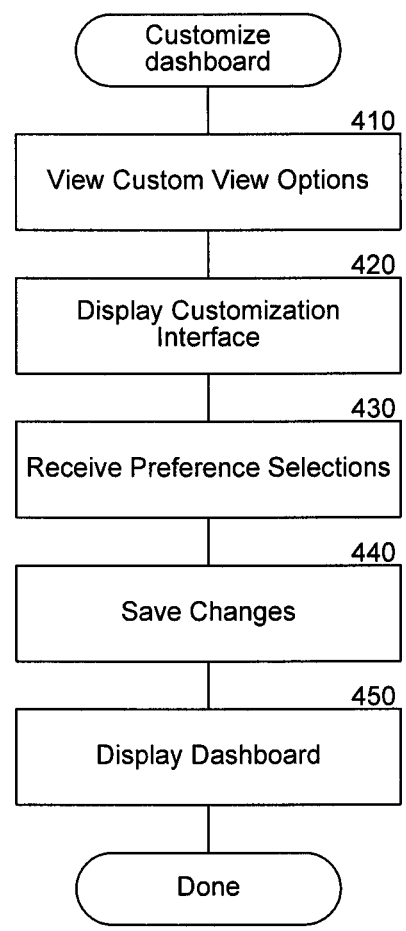
FIG. 4 is a flow diagram that illustrates the processing of a customization component when the user customizes the dashboard in one embodiment of the disclosure.

FIG. 4 is a flow diagram that illustrates the processing of the customization component 146 (FIG. 1) when the user customizes the dashboard in accordance with a particular embodiment. The customization component allows the user to customize his/her view (information content, colors, and so forth) of the system based on a predefined list of available features. Each user may customize the dashboard separately. The users can also filter and prioritize which alerts and information are important to them. In process portion 410, the component receives a request from the user to view custom view options. For example, the dashboard may provide a button or menu item for customizing the dashboard. In process portion 420, the component displays a user customization user interface with available preference selections. For example, FIGS. 5A-5E illustrate one customization interface. In process portion 430, the component receives preference selections from the user. For example, the user may select checkboxes, items from lists, and so forth based on available options for customizing the dashboard. In process portion 440, the component receives a request from the user to save changes to the user's selections. For example, the user may select an "OK" button in the displayed customization interface. In process portion 450, the component returns the user to the dashboard, which is displayed with the new preference selections. After process portion 450, this process concludes.

Figure 5A:
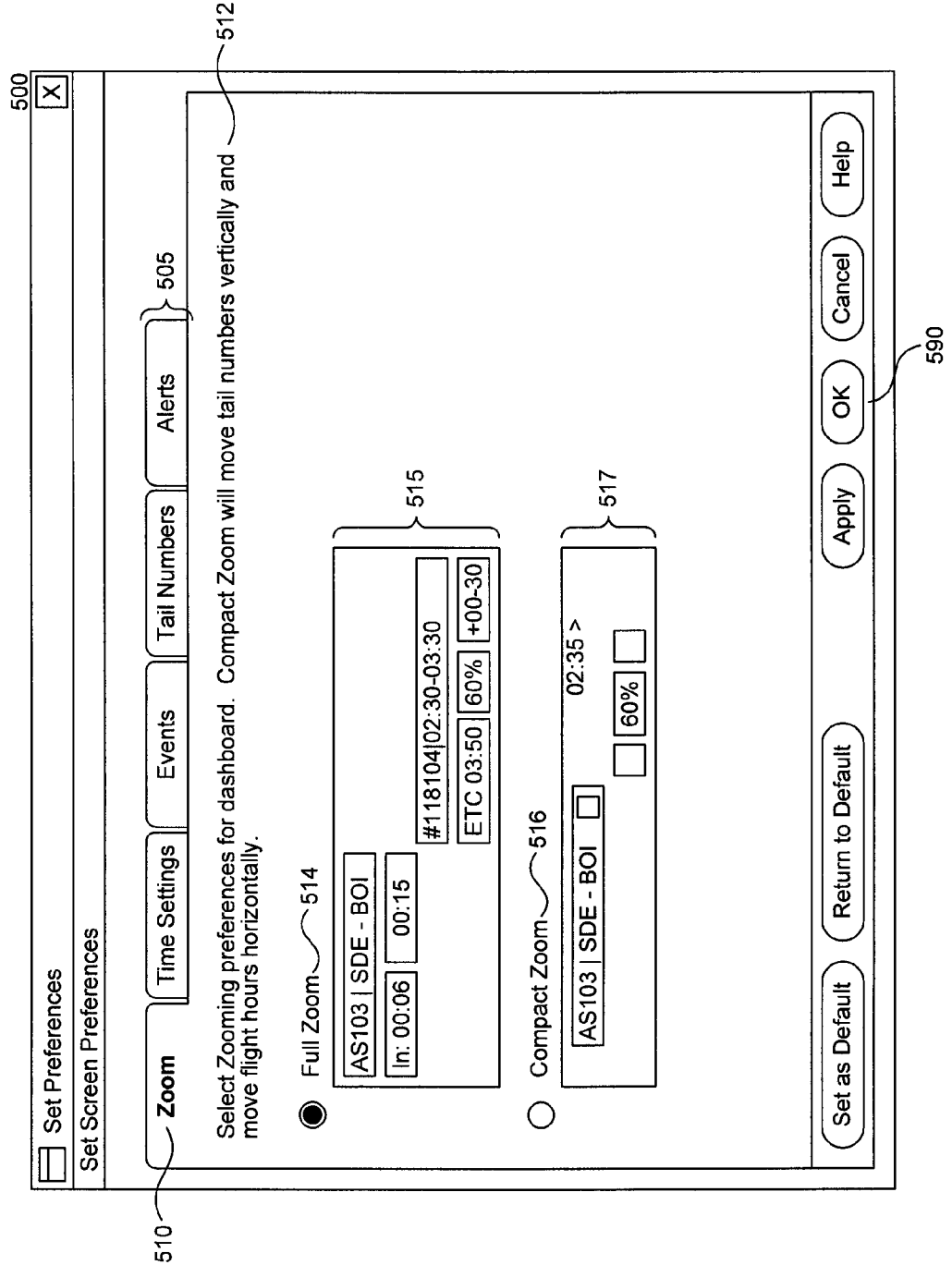

FIGS. 5A-5E are display diagrams that illustrate tabs of a user interface for receiving customizations from a user in accordance with a particular embodiment. The user interface 500 can include a row of tabs 505 that organize the types of customizations by category. FIG. 5A illustrates a zoom tab 510 that allows the user to select one of two views for the dashboard. A full zoom view shows detailed available flight and maintenance information to the user, whereas a compact zoom view shows more summarized information. The zoom tab 510 contains instructional text 512, a full zoom radio button 514, a full zoom illustration 515, a compact zoom radio button 516, and a compact zoom illustration 517. The instructional text 512 explains to the user how to use the configuration options. The full zoom radio button 514 allows the user to select the full zoom view. The full zoom illustration 515 displays an example to the user of how the dashboard will look if the user selects the full zoom view. The compact zoom radio button 516 allows the user to select the compact zoom view. The compact zoom illustration 517 displays an example to the user of how the dashboard will look if the user selects the compact zoom view. The main purpose of the zoom tab 510 is to allow the user to select either of the two views for the dashboard. When the user is finished making selections on each tab, the user selects the "OK" button 590 to save the customizations.

Figure 5B:
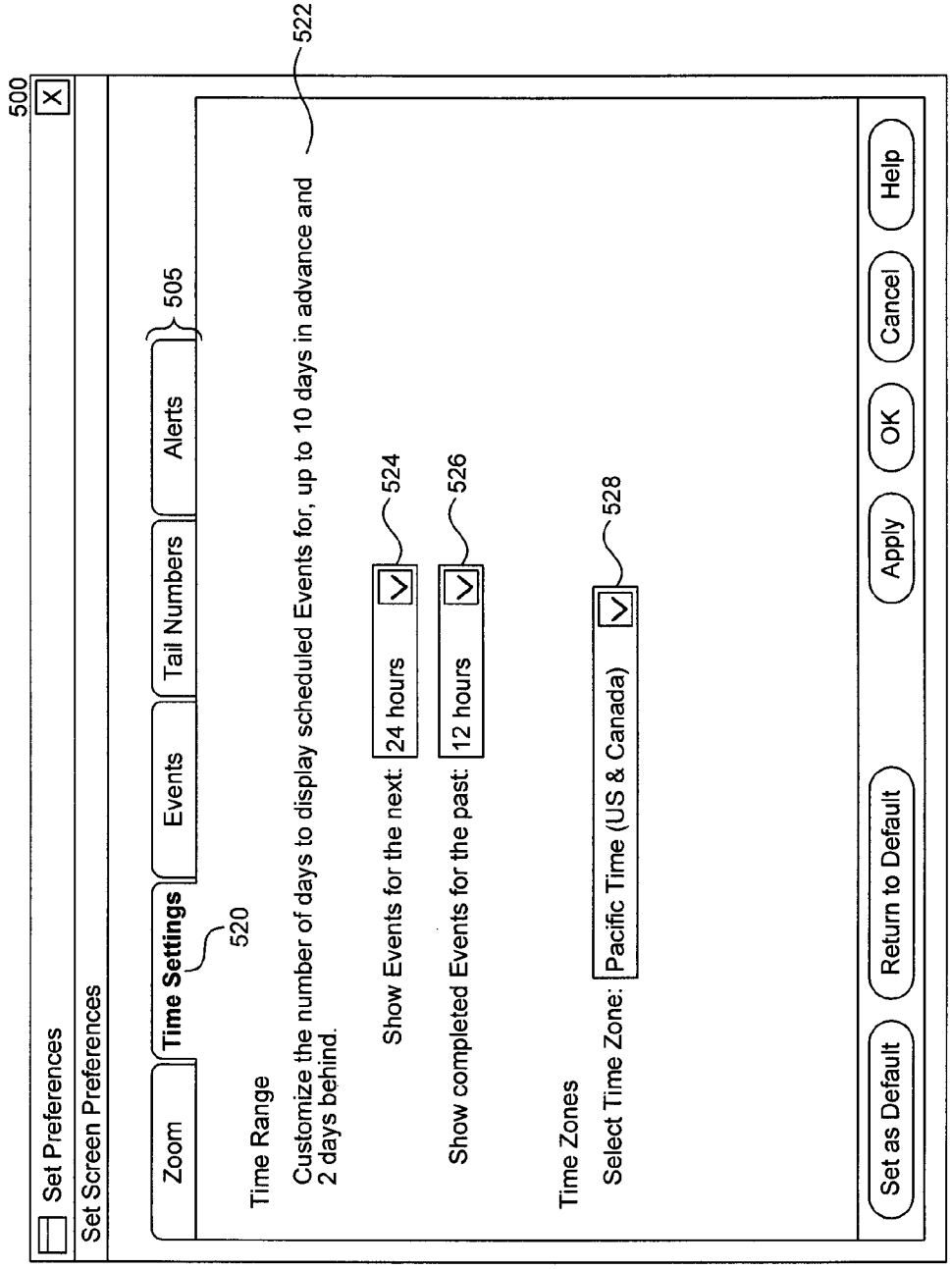

FIG. 5B illustrates a representative time settings tab 520 that contains selections for viewing upcoming flight and maintenance events (e.g., within the next 1-10 days), and prior flight and maintenance data (e.g., within the past 12 hours to 2 days). The user can also select the time zone for the time showing in the top right corner of the dashboard. This may not affect flight and maintenance events, which may always be shown in Zulu or UTC time. The time settings tab 520 contains instructional text 522, a future events dropdown list 524, a past events dropdown list 526, and a time zone dropdown list 528. The instructional text 522 explains to the user how to use the configuration options. The future events dropdown list 524 allows the user to select the range of future events that the dashboard will display. The past events dropdown list 526 allows the user to select the range of past events that the dashboard will display. The time zone dropdown list 528 allows the user to select the time zone for the time display of the dashboard.

Figure 5C:
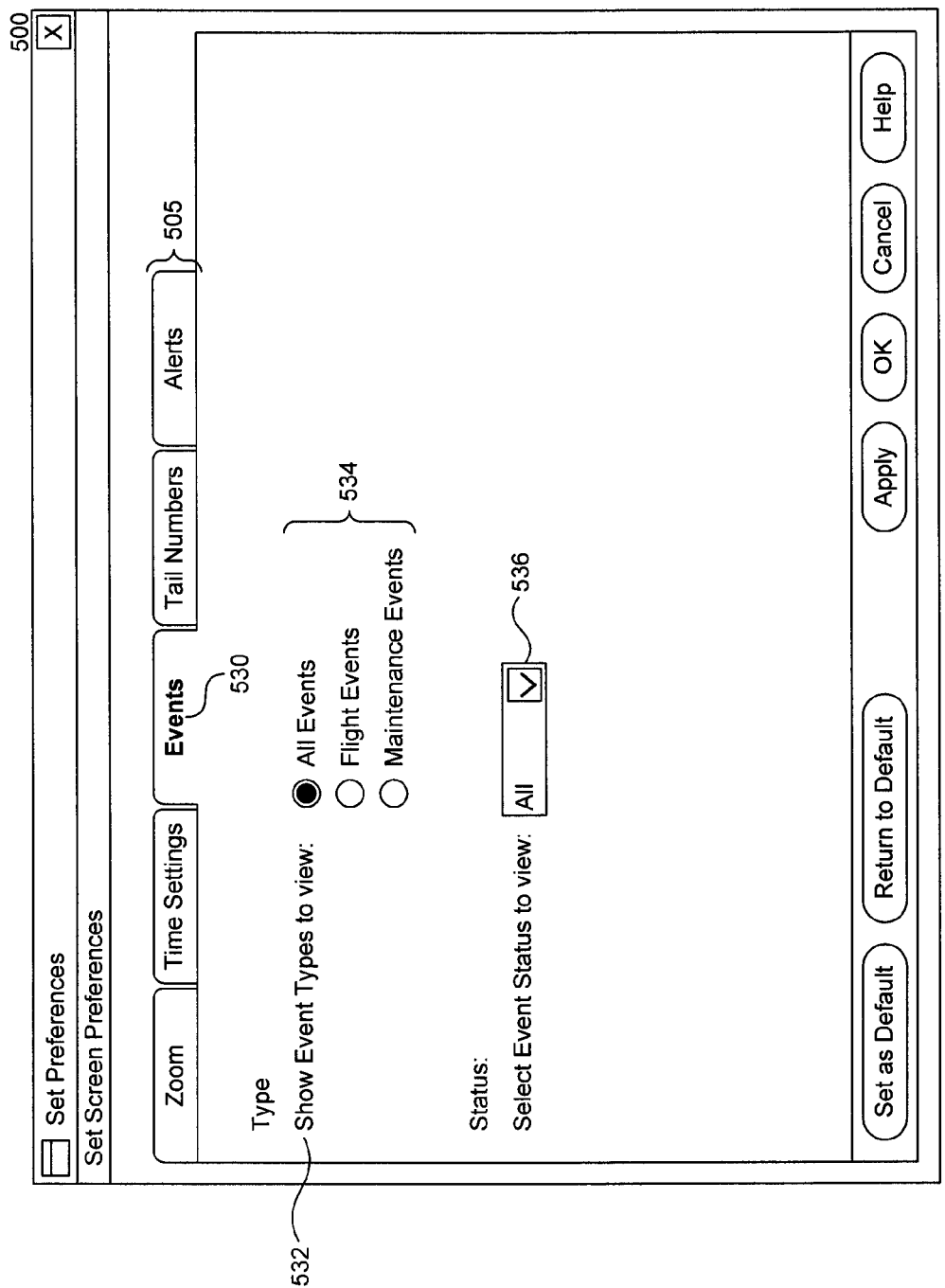

FIG. 5C illustrates a representative events tab 530 that allows the user to control which type and status of events are shown in the dashboard. The operator may view combined flight and maintenance information, flight events only, maintenance events only, or only some of these, such as flights by status (i.e., late or early). The events tab 530 contains instructional text 532, event type radio buttons 534, and an event status dropdown list 536. The instructional text 532 explains to the user how to use the customization options. The event type radio buttons 534 allow the user to select which types of events the system will display in the dashboard. The event status dropdown list 536 allows the user to filter events within the selected type based on various criteria.

Figure 5D:
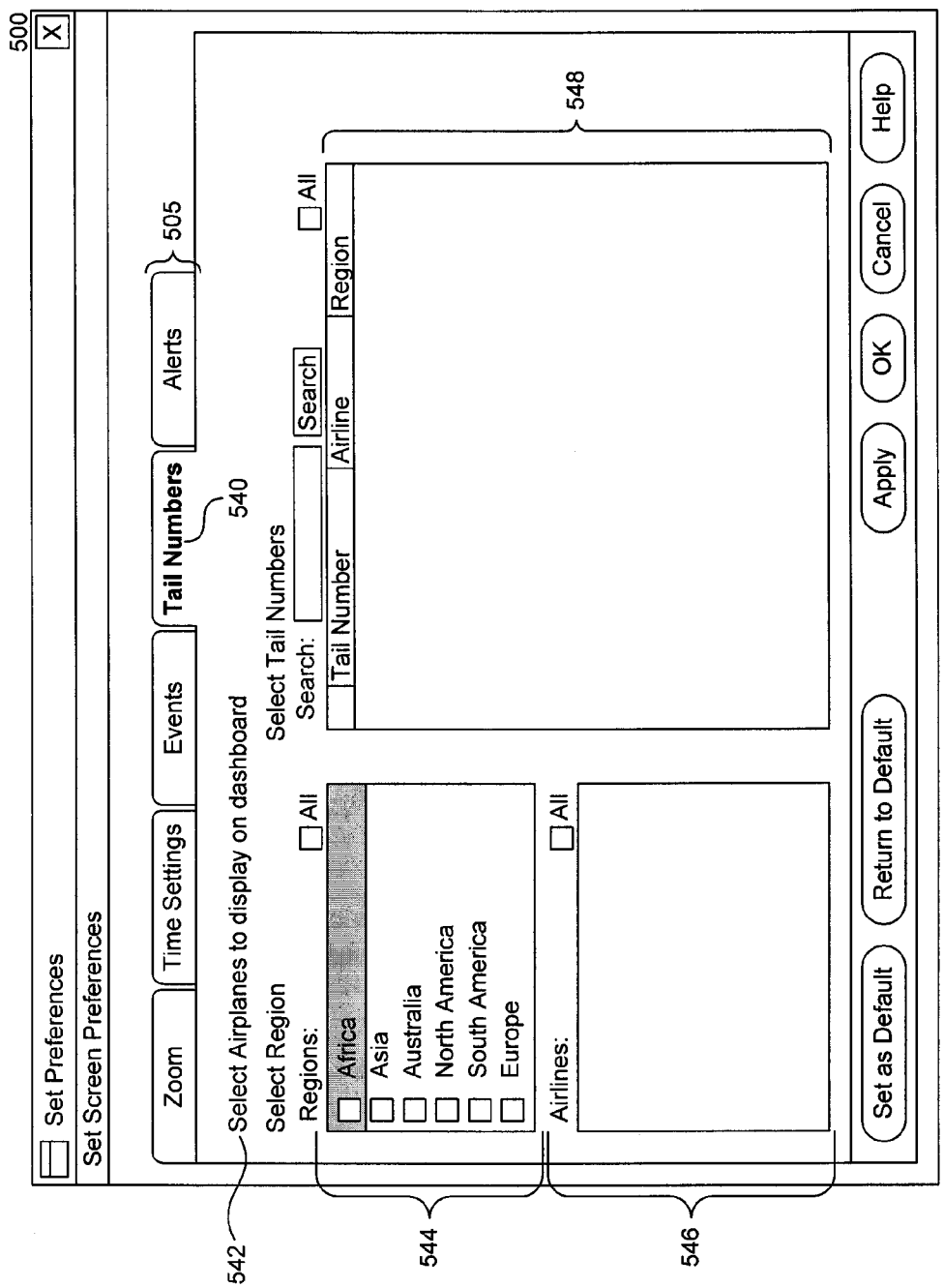

FIG. 5D illustrates a representative tail numbers tab that provides robust capabilities for the user to select tail numbers based on specific regions and airlines and display them on the dashboard. The interface has a hierarchical flow: regions selected will populate airlines, and airlines selected will populate tail numbers. The tail numbers tab 540 contains instructional text 542, a regions list 544, an airlines list 546, and a tail numbers table 548. The instructional text 542 explains to the user how to use the customization options. The regions list 544 allows the user to select one or more regions containing airplanes that the user may want to view in the dashboard. The user selects one or more regions by checking a checkbox next to each region. The airlines list 546 contains a list of airlines within the selected regions having airplanes that the user may want to view in the dashboard. The user selects one or more airlines by checking a checkbox next to each airline. The tail numbers table 548 lists tail numbers that identify airplanes within the selected region and airline. The tail numbers table 548 also offers the user a search box for searching for a specific tail number in case the quantity of listed tail numbers is large. The user selects tail numbers within the list 548 by checking a checkbox next to each tail number or selecting an "All" checkbox that selects all tail numbers in the list 548.

FIG. 5E illustrates a representative alerts tab that allows the user to set the alerts for the dashboard and a mobile device in one convenient location. The settings for dashboard alerts and mobile alerts are separated so that the user can make different alert customizations for each. The alerts tab 550 contains instructional text 552, sub-tabs 554, a select all alerts checkbox 555, an alerts table 556, and an options fieldset 558. The instructional text 552 explains to the user how to use the customization options. The sub-tabs 554 allow the user to select whether the user is currently customizing alerts for the dashboard or for a mobile device. The select all alerts checkbox 555 allows the user to quickly indicate that the user wants to receive all alerts. The alerts table 556 lists available types of alerts that the user can receive. The user selects alerts within the alerts table 556 by checking a checkbox next to each alert type. The options fieldset 558 receives additional filtering options for reducing the number of alerts that the user receives. For example, the user can elect to receive only alerts for selected regions and airlines. The user can also select the period for which the alerts are displayed (e.g., the last 24 hours).

Types of Customizations

The following tables list examples of types of user customizations grouped by category. This is not an exhaustive list, and those of ordinary skill in the art will recognize many other types of customizations that can be provided by the system.

User Preferences—In order to prevent users from being overloaded with unnecessary information and to view only information which they use frequently, users would like to customize their user experience when using the dashboard and receiving information on their mobile devices. Using the following settings, the user can customize many aspects of the dashboard and alerts sent to mobile devices

| Customization Name | Description |
| --- | --- |
| User.Pref.sel.alert.msg.type.dashboard | Sets the type of alerts the user receives on their dashboard. The user can select alert message types by individually selecting them, by category, or by priority. |
| User.Pref.sel.alert.msg.data.dashboard | Sets the content of alerts the user receives on their dashboard by selecting from the list of regions or airlines to which the user has access. |
| User.Pref.sel.alert.msg.type.mobile | Sets the type alerts the user receives on their mobile device by selecting alert message types by individually selecting them, by category, or by priority. |
| User.Pref.sel.alert.msg.data.mobile | Sets the content of alerts the user receives on their mobile device by selecting from the list of regions or airlines to which the user has access. |
| User.Pref.sel.dashboard.tails | Sets how many airplane tail numbers the user can view on their dashboard at one time. |

-continued

| Customization Name | Description |
| --- | --- |
| User.Pref.sel.dashboard.timezone | Sets the user's preferred time zone. |
| User.Pref.sel.dashboard.hours.view | Sets how many hours of the day the user can view on their dashboard at one time without having to scroll. |
| User.Pref.sel.dashboard.hours.fwd/bwd | Sets how many days or hours of the day the user can view ahead of or behind flight and maintenance events on the dashboard. |
| User.Pref.sel.airplane.view | Sets which regions, airlines, or tails to display. |
| DD.alert.messages.user.prefs | Sets the criteria that received alerts must meet to be sent to the user. The system only displays alert messages that meet the criteria based on categorization, priority, and airline. |
| DD.alert.messages.default | If no user preferences have been setup, the system displays alert messages based on a default set of customizations. This setting specifies the defaults. |
| DD.dashboard.tails.user.pref | Sets the number of airplane tails displayed in the dashboard on one screen. |
| DD.dashboard.tails.default | Sets a default value for the number of tails. |
| DD.dashboard.clocks | The dashboard displays two time clocks. One is based on UTC time and the other can be customized based on time zone. |
| DD.Dashboard.Time | Sets the time zone for the Gantt view. |
| DD.Dashboard.Event.Time | Sets the time zone for events. |
| DD.Dashboard.Alert.Time | Sets the time zone for alerts. |
| DD.Dashboard.clock.custom | Sets the time zone for the user clock. |
| DD.dashboard.clock.custom.default | Sets the default time zone for the user clock. |
| DD.dashboard.hours.screenview.user.pref | Sets the preferred hour range of events displayed in the dashboard. |
| DD.dashboard.hours.screenview.default | Sets the default hour range. |
| DD.dashboard.hours.fwdbwdview.user.pref | Sets the user-preferred hour/day range on the dashboard. |
| DD.dashboard.hours.fwdbwdview.default | Sets the default hour/day range. |
| DD.dashboard.airplaneview.user.pref | Sets the user-preferred airplane tail numbers to display on the dashboard. |
| DD.dashboard.airplaneview.default | Sets the default airplane tail numbers. |

Dashboard Maintenance Opportunities—A maintenance opportunity is a period of time where there is an opportunity to do maintenance on an airplane when no maintenance is already planned. This generally means that the airplane is on the ground and is available for a maintenance crew to perform maintenance on the airplane. Maintenance planners are always monitoring for potential maintenance opportunities. These users can use the customizable situational awareness system to notify them of potential maintenance opportunities using a rules-based and decision support system. In some embodiments, a maintenance opportunity is considered to be a time when an airplane is scheduled to be on the ground for more than an hour during the day at an airport where there is an MRO repair station.

| Customization Name | Description |
| --- | --- |
| DD.display.opportunity | For airplanes tails the user is monitoring in their dashboard, configures whether the system indicates available maintenance opportunities to the user |
| DD.Mx.opportunity.rule | Defines the rule for determining that a maintenance opportunity exists. |

Maintenance Activity—Users monitoring maintenance events generally would like to receive regular updates of the progress of the maintenance being performed, how much work has been completed compared to how much is still left to do, whether maintenance is on time, and an estimate of whether the maintenance will complete on time, early or late. In addition, users would like to be notified if additional maintenance work is found and whether the work has been added to the maintenance event to be fixed during the current maintenance or deferred to a later date. In some embodiments, the system generates an alert if an event has occurred that may potentially affect releasing the airplane on time (e.g., a delay because work is behind) and the delay code. This can be determined by monitoring whether parts have arrived or whether additional maintenance has been discovered.

| Customization Name | Description |
| --- | --- |
| DD.mx.event.progress | Determines whether the system displays the progress of a maintenance event in work. |
| DD.mx.event.progress.rule | Determines the rules for determining maintenance progress. |

| Customization Name | Description |
| --- | --- |
| DD.mx.delay.notes.write | Receives notes from the user related to the maintenance event. |
| DD.mx.delay.notes.write.stamped | Stamps notes from the user with the user's name and the time when the note was written. |
| DD.mx.delay.notes.write.nodelete | Determines whether the user can delete existing notes or only add notes. |
| DD.mx.delay.notes.read | Determines whether the user has permission to read notes associated with a maintenance event. |

Audit History—Certain users often need to review and analyze historical flight and maintenance event information to determine the root cause of disruptions. The system stores planned and actual times for flight legs and maintenance events for up to a certain period (e.g., 30 days). The system may also store alert messages for those events for the same period. Users can review these historical events and alerts messages using the dashboard and alert message box. Users can filter events using the already available filters (e.g., airplane and event filters) including a time period and event filter. In addition, the user can filter alert messages to view only a particular flight leg event, maintenance event or tail number. In some embodiments, the user interface replays historical events in the sequence in which the events occurred.

| Customization Name | Description |
| --- | --- |
| DD.event.historical.view | Determines the period over which prior events are displayed in the dashboard. |
| DD.event.delay.code.update.store | Determines the period for storing delay codes of past events. |
| DD.event.delay.code.alertmsg | Determines the period over which to display an alert message based on prior events. |
| DD.event.alertmsg.display | Determines the period over which the user can view alert messages for prior events. |

Mobile Devices—Users can receive alert messages from the system on a specified mobile device. Wireless devices allow people who are decision-makers and participants across the worldwide-extended enterprise to be at any location while remaining connected to flight operations. MRO and maintenance planners can be alerted to changing conditions immediately and access the relevant information to support decision-making while on the go. Users can configure which alert messages they would like to receive on their mobile device. In some embodiments, users specify an email address to which alerts should be sent. The email address may be associated with a typical email account, a short message service (SMS) number for a phone, or other device or system capable of receiving messages addressed like email.

| Customization Name | Description |
| --- | --- |
| MD.display.alert.messages.user.prefs | Determines the criteria of alert messages that the user has elected to receive based on categorization, priority, and airline. |
| MD.display.alert.messages.default | Determines the default alert criteria. |
| MD.send.alert.email | Specifies the email address of the user's mobile device for receiving alert messages. |

Types of Alerts

Users can customize which alert messages they receive through the dashboard or via mobile device based on an alert message category and priority. Allowing users to select which alert messages they receive filters out unnecessary messages that would otherwise clutter the dashboard or notifications on their mobile device. The user can select which alert messages they would like to receive by selecting individual alert message types, entire alert categories, or by alert priority. Users can also control alerts by choosing the region(s) or airline(s) for which they wish to receive messages.

The following table is a list of example alert messages that can be received from an external system or generated internally. The following list is merely illustrative of a representative embodiment, and other priorities may be established for the listed alerts in other embodiments.

| Alert Name | Category | Priority | Source of Alert Message (Internal - generated internally using business rules, External - received from an external system) |
|---|---|---|---|
| Maintenance Event invalidated by previous Flight Leg | Maintenance | High | External |
| Unscheduled Maintenance Event created | Maintenance | Med | External |
| Planned Maintenance Event Updated which will or was to occur within the next 24 hours | Maintenance | Med | External |
| A Maintenance Event Cancelled which will occur within the next 24 hours | Maintenance | Med (IMM Coordinator could consider this Med, Planner consider it Low). Also staffing notification | External |
| Estimated start of Maintenance Event will be started Late | Maintenance | Low (LATE is considered 60 min past scheduled start time) | External |
| Maintenance Event not started On-Time | Maintenance | Low (60 min) | Internal |
| Update received to Maintenance Event currently in progress changing the Planned End Time | Maintenance | High | External |
| Update received to Maintenance Event currently in progress, giving an Estimated Completion time which would be Earlier than planned | Maintenance | Low | External |
| Update received to Maintenance Event currently in progress, giving an Estimated Completion time later than planned | Maintenance | High | External |
| Maintenance Event not Ended On-Time | Maintenance | High (15 min rule applies) | External |
| Mx Opportunity (don't alert) | Maintenance | High | External |
| MIREP | Maintenance | Med | External |
| PIREP | Maintenance | Med | External |
| IMM Alert - Parts or Tools for a Maintenance Event are not available | Maintenance | High | External |
| Tail Swap | Flight | High | External |
| Flight Leg Cancelled | Flight | Med | External |
| Flight Leg not started on- Time | Flight | Med | External |
| Return to Gate/Ramp | Flight | High | External |
| Air Turnback (Flight Return) | Flight | High | External |
| Flight Diversion | Flight | High | External |
| Flight Deck Effects | Flight | High | External |

During a maintenance event, if a mechanic notices additional maintenance work that can or should be done the mechanic will create a maintenance report. Once this maintenance report has been created, an alert is sent to the dashboard using the Maintenance Report (MIREP) category. The alert contains information such as the maintenance event in which the MIREP was created, the airplane tail number, and a description of the additional work to be done. This alert is sent prior to a fix/defer decision being made.

If a part or tool allocated to a scheduled maintenance event that is to occur within the next 24 hours becomes unavailable for that maintenance event, the system generates an IMM Alert (parts/tools unavailable) alert with the Bill of Work (BOW) ID, description of the tool or part, and tool or part ID.

If during aircraft health monitoring the aircraft manufacturer receives an alert, then the alert can be forwarded to the dashboard as a Flight Deck Effect alert with the airplane tail number, flight number, time of the fault, fault code, and a fault description.

Figure 6:
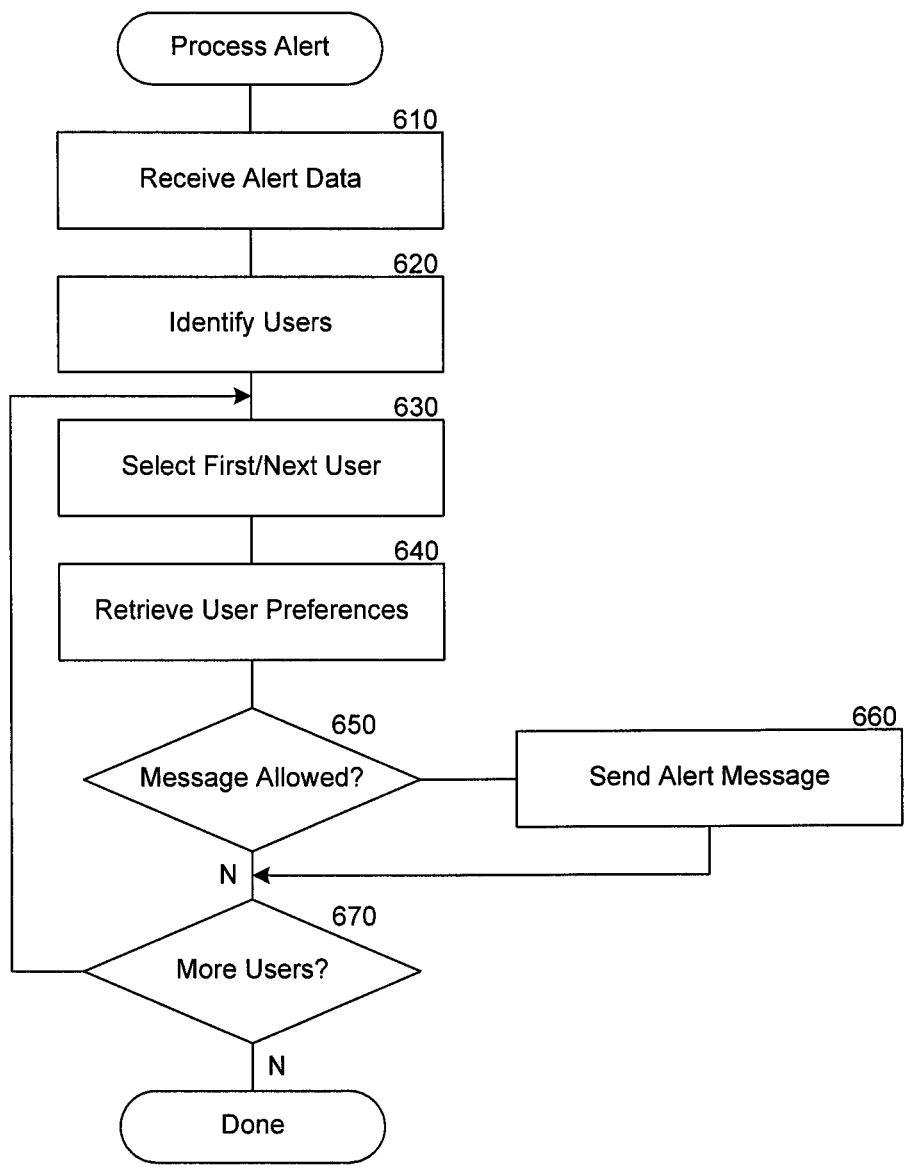
FIG. 6 is a flow diagram that illustrates the process performed by an alert component when new alert data is received in one embodiment of the disclosure.

FIG. 6 is a flow diagram that illustrates the process performed by the alert component when new alert data is received in accordance with a particular embodiment. Before the alert is received, the user has already stored a mobile messaging device identifier (e.g., an email address) with the system. In process portion 610, the component receives new alert data. For example, the alert data may specify that a flight has been delayed or other situational awareness information relevant to the user. In process portion, 620, the component identifies the users that have requested to receive this type of alert data. In process portion, 630, the system selects the first identified user. In process portion 640, the system determines whether the selected user's stored preferences indicate that the user wants to receive this type of alert data. In some embodiments, the component may also determine whether the user has sufficient permission to receive the alert data. In decision process portion 650, if the user's preferences indicate that the user wants to receive this type of alert data, then the component continues at process portion 660, else the component continues at process portion 670. In process portion 660, the component sends an alert message related to the alert data to the user's mobile device. In decision process portion 670, if there are more users, then the component loops to process portion 630 to select the next user, else the component completes.

Links to External Systems

There are external applications and documents that contain additional functionality and information that could assist the user in managing maintenance and disruptions. In particular embodiments, rather than having to exit the dashboard to view the external documentation and applications, the users can have direct access to these external sources from within the application, directly from the particular event or alert. For example, if a maintenance worker uses the system to determine when an aircraft is available for maintenance, the system may provide useful links to parts diagrams, maintenance articles, and so forth.

assist a user in normal monitoring and planning conditions, and aid the user to make better disruption and recovery decisions when situations occur. Events or other elements of the dashboard may link to these types of information.

| Information Type | Examples |
| --- | --- |
| Maintenance Event Information | Type of Maintenance Event - Planned, Planned and Scheduled, Unplanned and Scheduled |
| | The type of maintenance work to be performed |
| | Parts and Tools allocated and availability |
| | Personnel Resources required and allocated |
| | Hangar or Line Space allocated |
| | Field Trip Form to send a Maintenance Person to an off-site location to effect repairs |
| Airplane Information | Airplane Ownership and Leaser |
| | Airplane Configuration |
| | Maintenance History--Planned and Forecasted Maintenance |
| | Deferrals, CDL, MEL |
| | Engine Information |
| | AOG Requirements |
| | Landing Category |
| | Performance Restrictions |
| | Airplane Performance |
| | By Tail |
| | By Industry |
| | Class of airplane (model, engine type, configuration etc) |
| Flight Information | Dispatch Release - Airline System of Record (includes Passenger Record) |
| | Weather of Flight Leg -- at departing airport, arrival airport and enroute |
| | Flight Deck Effects |
| | Tail Swap Reason |
| MRO & Repair Station Information | Contact Information -names, numbers, email addresses and duty roster |
| | Maintenance Personnel Resources - Skills and Availability |
| | Hangar Bay Availability |
| | Planned and Forecasted Maintenance for that Repair Station |
| | Parts and Tools on hand for a MRO Repair Station |
| Airline (AOC) Information | Contact Information --names, numbers, email addresses and duty roster |
| | Communication Plan |
| OEM Documentation for Airplane | Airplane Maintenance Manual (AMM) |
| | Maintenance Planning Document (MPD) |
| | Fault Isolation Manual (FIM) |
| | Fault Repair Manual (FRM) |
| | Configuration Deviation List (CDL) |
| | Minimum Equipment List (MEL) |
| | General Maintenance Manual (GMM) |
| | Service Bulletins (SBs) |
| | Airworthiness Directive (ADs) |
| | Airplane Flight Manual (AFM) |
| Airport | Contact Information -names, numbers, email addresses |

Embodiments of the customizable situational awareness system are used to monitor and alert users to potential disruptions to their planned schedule or events that have affected their planned schedule. The system can also assist maintenance planners in planning maintenance work to be completed (e.g., in the next 10 days). The system may provide limited information when alerting users to situations. Other external applications, websites, and documentation can provide more extensive information about situations and disruptions that do occur. Depending on the type of situation and the role of the user, the user can jump directly from the customizable situational awareness system to the external application, document, or website that can give them additional information to better understand the situation or to perform an activity.

In addition to providing users with more information in particular (e.g., time-sensitive) situations, there is external information under normal monitoring conditions to which users can link to learn more about airplanes, flights, maintenance events, and so on. Below is a list of information that can

CONCLUSION

From the foregoing, it will be appreciated that specific embodiments of the customizable situational awareness system have been described herein for purposes of illustration, but that various modifications may be made in other embodiments. Although aircraft situational awareness systems have been described, the system can be used in other environments where situational awareness data is useful. For example, a packing and shipping facility could use the system to monitor the location of packages, forklifts, and other resources. Similarly, a government transportation department could use the system to monitor traffic and plan freeway flow and availability. Further, while advantages associated with certain embodiments have been described in the context of those embodiments, other embodiments may also exhibit such advantages, and not all embodiments need necessarily exhibit such advantages to fall within the scope of the disclosure. Accordingly, the disclosure can include other embodiments not shown or described above.

I claim:

1. An aircraft situational awareness system having a memory and a processor, the system comprising:
   a plurality of airline enterprise subsystems;
   an integration device coupled to the plurality of enterprise systems and receiving data relating to aircraft situational awareness from the enterprise systems;
   a decision support subsystem coupled to the integration device and correlating to situational information received from one or more of the enterprise subsystems with one or more business rules received from the integration device, the decision support subsystem further generating an aircraft situational awareness data set from the correlated data and process the aircraft situational awareness data set in view of one or more user-modifiable user profiles; and
   a user interface coupled to the integration device and the decision support subsystem, the user interface displaying a view of the aircraft situational awareness data set based, at least in part, on the one or more user profiles,
   wherein at least one of the subsystems comprises computer-executable instructions stored in memory for execution by the aircraft situational awareness system, and
   wherein the user interface
      receives a request from a user to view customization options for customizing the displayable view of the aircraft situational awareness data;
      displays a customization user interface having options for configuring the display of at least flight events, maintenance events, and alert messages;
      receives one or more preference selections from the user based on the displayed options;
      stores the preference selections received from the user in a nonvolatile storage device; and
      displays the view of the aircraft situational awareness data set based on the stored preference selections of the user.

2. The system of claim 1 wherein the user interface displays a view of the aircraft situational awareness data for one or more selected aircraft within a particular fleet of aircraft.

3. The system of claim 1 wherein the user interface correlates the timing of actual events with one or more scheduled events to generate a timing schedule for each aircraft's departure and arrival.

4. The system of claim 1 wherein the user interface generates real-time alerts of deviations between a predetermined operational plan and the timing of actual day-of-operations events.

5. The system of claim 1 wherein the user interface generates and displays a data set for one or more of maintenance operations users, airline flight operations center users, airline management users, station operations users, vendor operations users, and passenger services users.

6. The system of claim 1 wherein the data received from the airline enterprise subsystems includes data related to a condition of an aircraft in need of one or more resources, and wherein the decision support subsystem is further provides at least one recommendation to the user interface with data related to how best to address the conditions associated with the aircraft.

7. The system of claim 1 wherein the user interface displays a view of the aircraft situational awareness data set in real-time to all affected users.

8. The system of claim 1 further comprising a generate alerts component sending alerts to users by, for each alert, receiving alert data, identifying users whose profiles indicate that the user should receive the alert, and sending the alert to a mobile device associated with each identified user.

9. A method in a computing device having a memory and a processor for providing an enterprise with situational awareness data for conditions related to aircraft departure, the method comprising:
   receiving data from a plurality of airline enterprise systems related to one or more events that can affect conditions related to an aircraft's departure;
   correlating the received data in accordance with one or more business rules;
   generating an aircraft departure situational awareness data set from the correlated data and processing the aircraft departure situational awareness data set in view of one or more user-customizable user profiles; and
   displaying with a user interface a view of the aircraft situational awareness data set to a user based, at least in part, on the user profile associated with the user,
   wherein the user interface
      receives a request from a user to view customization options for customizing the displayable view of the aircraft situational awareness data,
      displays a customization user interface having options for configuring the display of at least flight events, maintenance events, and alert messages;
      receives one or more preference selections from the user based on the displayed options,
      stores the preference selections received from the user in a nonvolatile storage device,
      displays the view of the aircraft situational awareness data set based on the stored preference selections of the user, and
   wherein the receiving, correlating, generating, and displaying are performed by the processor executing instructions stored in memory.

10. The method of claim 9 wherein receiving data from a plurality of airline enterprise systems comprises:
    receiving data from a first portion of the airline enterprise systems that are located on board aircraft; and
    receiving data from a second portion of the airline enterprise systems that are ground based, including at least one of an airline-based system, an airport-based system, and air traffic service providers.

11. The method of claim 9 wherein displaying a view of the aircraft situational awareness data set comprises displaying a view of the aircraft situational awareness data set that is relevant for a task performed by the user directed to the aircraft's departure.

12. The method of claim 9 wherein displaying a view of the aircraft situational awareness data set comprises displaying a view of the aircraft situational awareness data set in real-time to multiple users.

13. The method of claim 9 wherein receiving data from a plurality of airline enterprise systems comprise receiving data from one or more of airline management and operations, maintenance operations, aircraft, airport management and operations, aircraft suppliers, regulatory authorities and independent airport service providers.

14. The method of claim 9 wherein receiving data related to one or more events that can affect conditions related to an aircraft's departure comprises receiving at least one of status tracking information and operational planning information from at least one of an airplane, an airport, and an airline.

15. The method of claim 9 further comprising receiving a selection of displayed situational awareness data from the user and navigating to an external application based on the selected situational awareness data.

16. The method of claim 9 wherein receiving data comprises receiving data from at least one of a Terminal Wireless LAN Unit, a Crew Wireless LAN Unit, and ACARS.

17. The method of claim 9 wherein the displayed view of the aircraft situational awareness data filters out at least some situational awareness data based on the user profile associated with the user.

18. The method of claim 9 further comprising sending an alert message to a mobile device associated with the user based on the user profile associated with the user and including at least a portion of the situational awareness data.

19. An aircraft situational awareness system having a memory and a processor, the system comprising:
- a plurality of airline enterprise subsystems;
- an integration device coupled to the plurality of enterprise systems and receives data relating to aircraft situational awareness from the enterprise systems;
- a decision support subsystem coupled to the integration device and correlating to situational information received from one or more of the enterprise subsystems with one or more business rules received from the integration device, the decision support subsystem further being configured to generate an aircraft situational awareness data set from the correlated data and process the aircraft situational awareness data set in view of one or more user-modifiable user profiles; and
- a user-customizable interface coupled to the integration device and the decision support subsystem, the user interface displaying a view of the aircraft situational awareness data set based, at least in part, on the one or more user profiles, wherein the user interface
- receives a request from a user to view customization options for customizing the displayable view of the aircraft situational awareness data,
- displays a customization user interface having options for configuring the display of at least flight events, maintenance events, and alert messages;
- receives one or more preference selections from the user based on the displayed options,
- stores the preference selections received from the user in a nonvolatile storage device,
- displays the view of the aircraft situational awareness data set based on the stored preference selections of the user, and wherein at least one of the subsystems comprises computer-executable instructions stored in memory for execution by the aircraft situational awareness system.

* * * * *